United States Patent
Eichenseer et al.

(10) Patent No.: US 9,583,228 B2
(45) Date of Patent: Feb. 28, 2017

(54) SCATTERED RADIATION GRID OF A CT DETECTOR

(71) Applicant: Siemens Aktiengesellschaft, Munich (DE)

(72) Inventors: Mario Eichenseer, Hirschaid (DE); Andreas Freund, Heroldsbach (DE); Stefan Wirth, Erlangen (DE)

(73) Assignee: SIEMENS AKTIENGESELLSCHAFT, Munich (SE)

( * ) Notice: Subject to any disclaimer, the term of this patent is extended or adjusted under 35 U.S.C. 154(b) by 160 days.

(21) Appl. No.: 14/391,809

(22) PCT Filed: Apr. 16, 2013

(86) PCT No.: PCT/EP2013/057902
§ 371 (c)(1),
(2) Date: Oct. 10, 2014

(87) PCT Pub. No.: WO2013/156478
PCT Pub. Date: Oct. 24, 2013

(65) Prior Publication Data
US 2015/0078534 A1  Mar. 19, 2015

(30) Foreign Application Priority Data
Apr. 20, 2012 (DE) .................. 10 2012 206 546

(51) Int. Cl.
*G21K 1/00* (2006.01)
*G21K 1/10* (2006.01)
(Continued)

(52) U.S. Cl.
CPC .............. *G21K 1/10* (2013.01); *G01T 1/2985* (2013.01); *G21K 1/025* (2013.01)

(58) Field of Classification Search
CPC ......... G21K 1/10; G21K 1/025; G01T 1/2985
(Continued)

(56) References Cited

U.S. PATENT DOCUMENTS 5,233,193 A      8/1993  Arakawa
2003/0021379 A1  1/2003  Klotz et al.
(Continued)

FOREIGN PATENT DOCUMENTS

CN    1407333 A    4/2003
CN    1682318 A   10/2005
(Continued)

OTHER PUBLICATIONS

Studnitzky T., Strauβ A., Stephani G.; Dreidimensionaler Siebdruck; rapidX, Feb. 2010; Carl-Hanser Verlag Menchen, pp. 27-29;; 2010.
(Continued)

*Primary Examiner* — Courtney Thomas
(74) *Attorney, Agent, or Firm* — Harness, Dickey & Pierce, PLC

(57) ABSTRACT

A scattered radiation grid of a CT detector is disclosed and includes a plurality of detector elements arranged in multiple cells in the phi direction and in the z direction of a CT system, having a plurality of free passage channels arranged to correspond to the detector elements, and walls fully enclosing the free passage channels at the longitudinal sides thereof. According to an embodiment of the invention, the walls of the scattered radiation grid are produced using a 3D screen-printing method.

26 Claims, 2 Drawing Sheets

(51) Int. Cl.
*G01T 1/29* (2006.01)
*G21K 1/02* (2006.01)

(58) Field of Classification Search
USPC .................................................. 378/145–154
See application file for complete search history.

(56) References Cited

U.S. PATENT DOCUMENTS

| | | |
|---|---|---|
| 2004/0057556 A1 | 3/2004 | Luhta et al. |
| 2004/0120464 A1 | 6/2004 | Hoffman |
| 2007/0025518 A1 | 2/2007 | Levene et al. |
| 2007/0064878 A1 | 3/2007 | Heismann |
| 2007/0071163 A1 | 3/2007 | Sakula |
| 2008/0023636 A1 | 1/2008 | Joung |
| 2009/0039562 A1 | 2/2009 | Freund et al. |
| 2011/0019801 A1 | 1/2011 | Miess |
| 2012/0069954 A1* | 3/2012 | Iso .......................... A61B 6/03 378/7 |
| 2012/0087477 A1 | 4/2012 | Beck |

FOREIGN PATENT DOCUMENTS

| | | |
|---|---|---|
| CN | 1707699 A | 12/2005 |
| CN | 1791944 A | 6/2006 |
| CN | 1936557 A | 3/2007 |
| DE | 19730755 A1 | 1/1999 |
| DE | 102006033497 A1 | 1/2008 |
| DE | 102005044650 B4 | 7/2008 |
| DE | 102008061486 A1 | 2/2010 |
| DE | 102010011581 A1 | 2/2011 |

OTHER PUBLICATIONS

Studnitzky T., Strauβ A.; Metallischer Siebdruck als Fertigungsverfahren für die Mikrosysterntechnik; Mikrosytemtechnik Kongress 2009, Oct. 12-14, Berlin, Paper p. 8.10; VDE Verlag GmbH.—ISBN 978-3-8007-3183-1; 2009; DE. German Office Action dated Feb. 2, 2014.
International Search Report PCT/ISA/210 for International Application No. PCT/EP2013/057902 Dated Jul. 12, 2013.
Written Opinion of the International Searching Authority PCT/ISA/237 for International Application No. PCT/EP2013/057902 Dated Jul. 12, 2013.
Chinese Office Action and English translation thereof mailed Dec. 1, 2015.

* cited by examiner

SCATTERED RADIATION GRID OF A CT DETECTOR

PRIORITY STATEMENT

This application is the national phase under 35 U.S.C. §371 of PCT International Application No. PCT/EP2013/057902 which has an International filing date of Apr. 16, 2013, which designated the United States of America, and which claims priority to German patent application number DE 102012206546.6 filed Apr. 20, 2012, the entire contents of each of which are hereby incorporated herein by reference.

FIELD

At least one embodiment of the invention generally relates to a scattered radiation grid of a CT detector comprising a plurality of detector elements arranged in multiple rows in the phi direction and z direction of a CT system, the grid having a plurality of free passage channels arranged to correspond to the detector elements and the free passage channels being fully enclosed by walls at their longitudinal sides.

BACKGROUND

Scattered radiation grids, also referred to as collimators, for detectors in CT systems are generally known. Until now stacks of thin tungsten plates bonded in a support mechanism were used in CT detectors. These allow the suppression of scattered radiation in the phi direction, in other words in the gantry rotation direction. Until now there was no collimation in the z direction or system axis direction. However it is also known that scattered beam correction is much more effective with a collimator acting in the phi direction and the z direction than with a simple phi collimator, particularly in dual source CT systems. This can be demonstrated by a significant dose reduction for a given contrast/noise ratio or improved artifact reduction.

Also when greater detector z coverage is required, it becomes increasingly difficult to manufacture the support mechanism with enough accuracy to hold the plates in position. If such a phi/z collimator is built in the conventional manner, in other words with individual plates, there is a further problem in that the plates have to be aligned with the focus of the x-ray tube in both directions.

As it is difficult to produce single-piece collimators that extend over the entire detector surface, a modular structure is often used here. One problem with scattered radiation grids of modular structure with a number of adjacent grid modules is that artifacts are produced in the projections recorded therewith in the region of the joining points of two grid modules, having a negative effect on the image quality of a tomographic image data record reconstructed from such projections or producing visible artifacts in the tomographic representation. It is therefore necessary with such collimator modules for different wall thicknesses to be implemented at different positions on the component, for example on the beam exit side or at the edges adjoining adjacent modules.

A collimator structure, in which plates embodied in the manner of combs are intermeshed, is also known from the publication DE 10 2005 044 650 B4. This method is complex and is also made problematic in that the plates should be aligned with the focus.

It is also known from the publication US 2008/0023636 A1 that polymers filled with metal particles can be made to harden in a grid-type form. The disadvantage of this method is the limited fill level of the compound at around 50%, which significantly reduces the collimation effect due to the reduced absorption capacity.

It is further proposed in publication DE 10 2010 011 581 A1 that the walls in both directions should be produced by selective laser melting SLM. SLM is a method in which metallic components can be produced in almost any complex geometries directly from 3D CAD data. It involves many layers of powdered metal being melted selectively one above the other using a laser beam based on the calculated surfaces, until the desired structure is produced. The method is such that the structures produced in this manner have very rough surfaces, which have to be further processed by way of a series of subsequent processes. Also it is not always possible to achieve all the desired wall thicknesses.

SUMMARY

At least one embodiment of the invention is directed to an improved scattered radiation grid of a CT detector.

Advantageous developments of the invention are the subject matter of subordinate claims.

The inventors have identified that it is advantageous to produce scattered radiation grids that are effective in two dimensions and can in some instances be combined in a modular manner to form a larger unit using a three-dimensional screen-printing method. In this process a suspension of a highly absorbent material, preferably powdered metal, for example lead, copper, molybdenum, tantalum, tungsten or another element with a high absorption coefficient, and a binder are printed on top of one another layer by layer using a screen, thereby achieving a three-dimensional structure. By changing the screen in such a manner that the opening raster becomes narrower or wider, or generally changes, as the number of layers increases, it is possible to align the walls of the collimator with the focus and to configure the channels in the shape of truncated pyramids.

With such a method such layering first produces a blank which does not yet have the final strength. For the final hardening process the resulting blank is hardened by means of a concluding sintering process after the ultimate component height has been achieved.

BRIEF DESCRIPTION OF THE DRAWINGS

Embodiments of the invention are described in more detail below with reference to the figures, in which only the features required for an understanding of the invention are illustrated. The following reference characters are used: 1: dual source CT system; 2: first x-ray tube; 3: first detector; 4: second x-ray tube; 5: second detector; 6: gantry housing; 9: system axis; 10: grid, grid module; 11: cylindrical casing/spheres; G: scattered radiation grid made up of a number of grid modules; K: passage channel; W: wall.

In detail.

DETAILED DESCRIPTION OF THE EXAMPLE EMBODIMENTS

Figure 1:
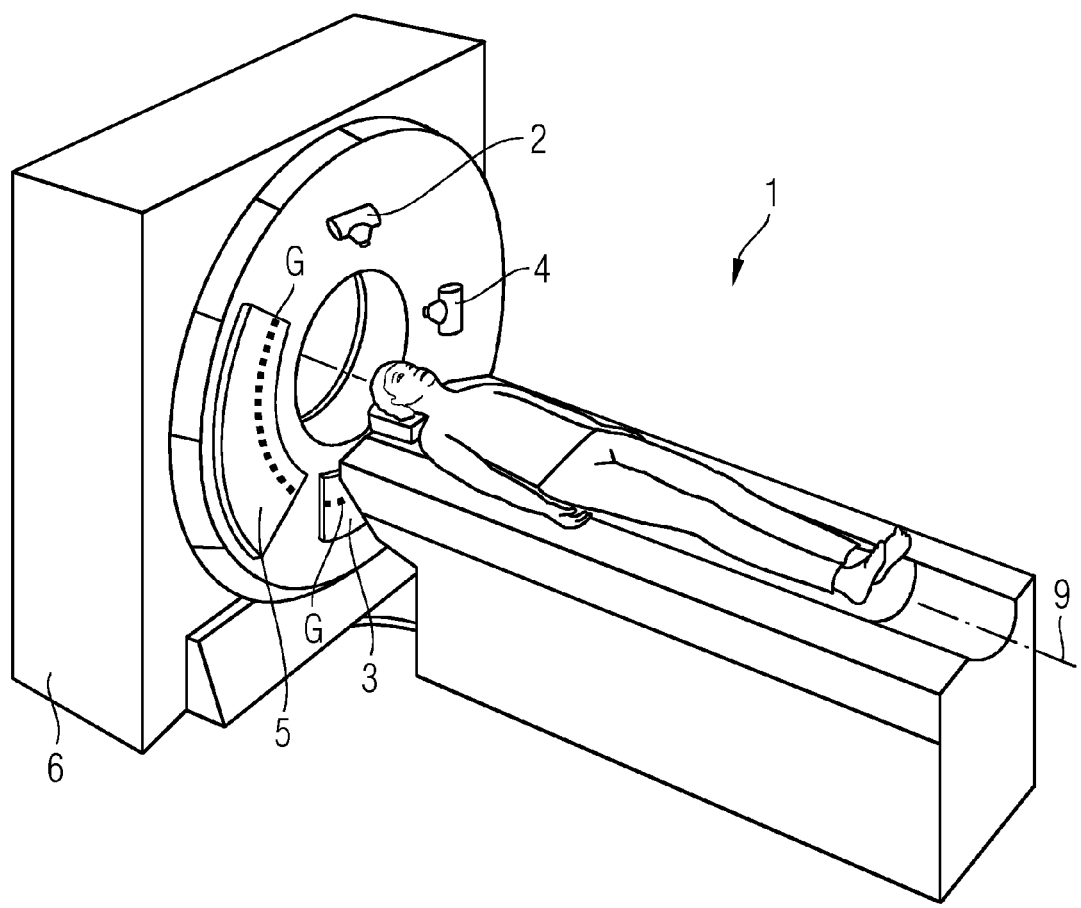
FIG. 1 shows a dual source CT system with scattered radiation grids in front of the detectors.

The inventors have identified that it is advantageous to produce scattered radiation grids that are effective in two dimensions and can in some instances be combined in a modular manner to form a larger unit using a three-dimensional screen-printing method. In this process a suspension of a highly absorbent material, preferably powdered metal, for example lead, copper, molybdenum, tantalum, tungsten or another element with a high absorption coefficient, and a binder are printed on top of one another layer by layer using a screen, thereby achieving a three-dimensional structure. By changing the screen in such a manner that the opening raster becomes narrower or wider, or generally changes, as the number of layers increases, it is possible to align the walls of the collimator with the focus and to configure the channels in the shape of truncated pyramids.

With such a method such layering first produces a blank which does not yet have the final strength. For the final hardening process the resulting blank is hardened by means of a concluding sintering process after the ultimate component height has been achieved.

Advantages of at least one embodiment of the proposed method are that much greater component accuracy can be achieved with screen-printing than with the known methods. Wall roughness and wall position differences in particular are greatly reduced compared with those achieved using SLM methods, in particular thinner walls can also be achieved than when using the SLM method. It is therefore also possible to design the outer walls of the component just with half the wall thickness D so that when a number of grid modules are lined up to form an overall grid, the effective wall thickness Dx2 at the joining surfaces of the grid modules is the same as the wall thickness in the interior of the component.

Also wall regions on the lower face of the collimator, in other words on the beam exit side, can also be configured thicker with the proposed method, simply by changing the screen. This embodiment prevents a variable shadow being thrown due to instability of the x-ray focus onto the active pixel surface.

A further advantage of the screen-printing method is that the process surface of typical screen-printing machines is much larger than the process surface of SLM machines. Therefore many more components can be produced at the same time in one pass. Also larger collimators can be produced, which span a number of sensor boards or even a number of detector modules. Specific structures for assembling the collimators in the detector mechanism can also be produced easily.

The particular two-step screen-printing production method, in which a relatively stable but not yet finally hardened blank is produced by multiple screen-printing in the first step, the blank only achieving its final strength in the second step, means that the as yet not finally hardened blank can undergo additional shaping after screen-printing and before the final hardening. It is therefore possible to produce a blank with an initially simple rectangular outer structure and then to act on the blank with a shaping effect so that an alignment of the walls and the radiation-conducting passage channels is brought about in the direction of a common focus. A blank shaped in this manner can then be made to achieve the desired final strength by sintering in the second step.

Based on these basic concepts the inventors propose a scattered radiation grid of a CT detector comprising a plurality of detector elements arranged in multiple rows in the phi direction and z direction of a CT system, the scattered radiation grid having a plurality of free passage channels arranged to correspond to the detector elements and the free passage channels being fully enclosed by walls at their longitudinal sides. According to the invention the walls of the scattered radiation grid are produced using a three-dimensional screen-printing method.

To structure the walls during the course of the screen-printing method a suspension of powdered metal and binder can preferably be used but it is also possible to use a suspension of another material with a high x-ray absorption coefficient, for example an element with an atomic number greater than 19, in other words an element from the fourth group, preferably from the fifth group, of the periodic system. In principle here, the greater the effective active cross section of the wall material, the more efficiently the unwanted scattered radiation is absorbed.

During the course of the printing method passage channels in the shape of truncated pyramids can be produced by replacing the screens used at least once, in other words passage channels, the through passage surface of which is larger at one end of the channel than at the other end, their longitudinal axes being aligned respectively with a common focus.

Also during the course of the printing method passage channels with a cross section that varies with height or passage channels in the shape of truncated pyramids can be produced by replacing the screen used at least once or a number of times with a successively changing, preferably narrowing covered region in the screen.

The scattered radiation grid in a not yet finally hardened state—and without alignment of the passage channels with a common focus—can generally be shaped in such a manner that the passage channels in the shape of truncated pyramids are shaped in such a manner that their longitudinal axes are respectively aligned with a common focus.

Similarly the passage channels and/or walls can be produced so that they are aligned parallel to one another in a first production phase and a mechanical shaping process can be applied to them before a final hardening, bringing about the alignment of the passage channels or the walls with a common focus.

During such a mechanical shaping process a scattered radiation grid that is originally cuboid in respect of its external dimensions can be pressed into the shape of a truncated cone. Alternatively the radiation entry side and/or radiation exit side can be pressed onto a cylindrical or spherical surface, so that the radiation entry side and/or radiation exit side is molded to the cylindrical or spherical surface and the walls and passage channels are therefore aligned with a focus.

It can also be advantageous for the passage channels to be embodied as narrowed in the region of the beam exit side of the scattered radiation grid. This prevents or at least reduces shadowing due to slight variations in the focus position relative to the detector.

At least one embodiment of the inventively produced scattered radiation grid can on the one hand be a complete scattered radiation grid. The scattered radiation grid can also be made up of a number of individually produced grid modules, the grid modules then having the features of the scattered radiation grid as described above.

In particular it is advantageous here if the walls of the grid modules forming an outer face of the grid modules are configured thinner than, preferably half as thin as, the remaining walls of the grid modules. This means that the same effective wall thickness results at the joining surfaces of the grid modules as at the other walls within the grid modules. This broadly standardizes compensation for scattered radiation over the entire detector.

The outer walls of the grid modules can also be embodied in such a manner that the grid modules engage in one another with a form fit.

Some of the walls of the grid modules can also have elongations on the beam exit side, serving for alignment at the detector.

Finally during the production of the scattered radiation grid or the grid modules the change between differently dimensioned screens can be embodied in such a manner that the walls of the grid or the grid modules are configured so that they taper in steps. The advantage of such an embodiment is that fewer different screens have to be provided and the fact that there are fewer screen changes means that there is also less calibration outlay, in other words the production method is generally more economical.

FIG. 1 shows a dual source CT system 1 with two emitter/detector systems consisting of a first x-ray tube (emitter) 2 with a first detector system 3 positioned opposite and a second x-ray tube 4 offset by an angle of 90° with a detector system 5 positioned opposite, said emitter/detector systems being arranged on a gantry in a gantry housing 6. Both detector systems 3 and 5 each have a scattered radiation grid G in order primarily to intercept the scattered radiation produced in each instance by the other emitter/detector system. The scattered radiation grids (only shown schematically here) are produced as described above, are modular in structure and bring about a reduction of scattered radiation in both the phi direction and the z direction. The z direction here is considered to be the coordinate axis lying in the direction of the system axis 9 and the phi direction is considered to be the rotational direction of the gantry, in other words the direction of the detector rows.

Figure 2:
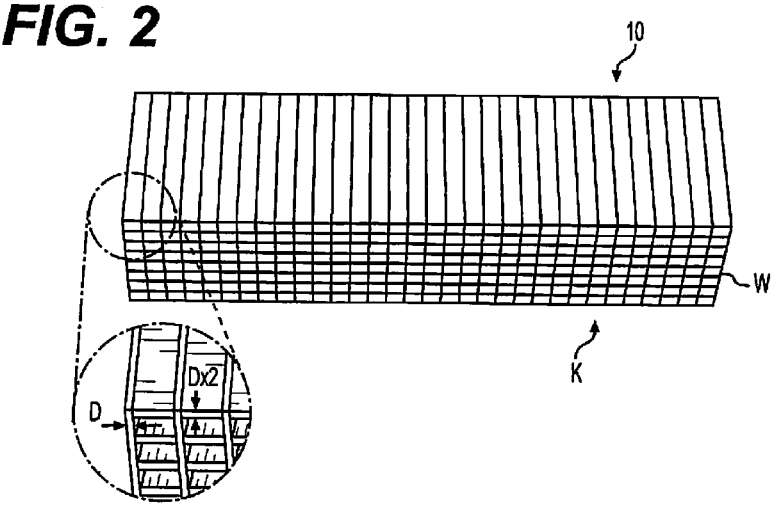
FIG. 2 shows a perspective 3D view of a scattered radiation grid or grid module.
Figure 3:
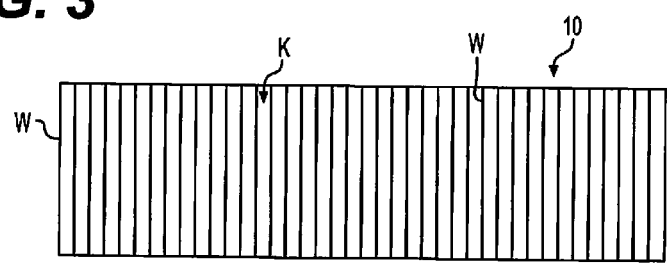
FIG. 3 shows a side view of a scattered radiation grid or grid module.
Figure 4:
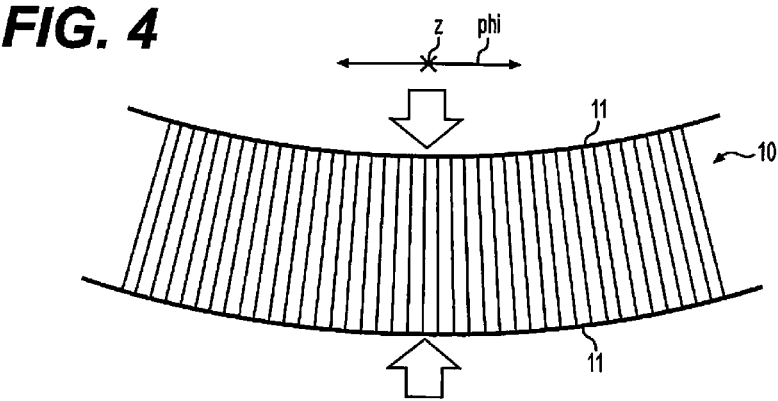
FIG. 4 shows a scattered radiation grid or grid module shaped on a cylindrical casing with passage channels aligned with a focus.

FIGS. 2 to 4 are intended to show how a grid is produced from a blank produced in an initially rectangular shape using the 3D screen-printing method by shaping it on a cylindrical casing, the passage channels of the grid being aligned with a common focus.

FIG. 2 shows a perspective 3D diagram of a grid or grid module 10, the structure of which is essentially rectangular. Therefore all the walls W and passage channels K produced there are aligned parallel to one another. FIG. 3 shows the scattered radiation grid or grid module 10 again from the side. In FIG. 4—again shown in a side view—the grid 10 from FIG. 3 is shaped with the aid of two cylindrical casings 11 or two spheres 11 so that the grid structure and the passage channels in the grid structure are aligned with a common focus—which should correspond to the focus of the x-ray tube present in the emitter/detector system.

Although the invention has been illustrated and described in detail using the preferred exemplary embodiment, the invention is not restricted by the disclosed examples and other variations can be derived therefrom by the person skilled in the art without departing from the scope of protection of the invention.

The invention claimed is:

1. A scattered radiation grid of a CT detector, comprising: a plurality of detector elements arranged in multiple rows in a phi direction and z direction of a CT system, including walls, enclosing a plurality of free passage channels, arranged to correspond to the detector elements, at their longitudinal sides,
wherein the scattered radiation grid is made up of a number of individually produced grid modules; and
wherein the walls of the grid modules forming an outer face of the grid modules are configured thinner than the remaining walls of the grid modules.

2. The scattered radiation grid of claim 1, wherein the walls of the grid modules forming an outer face of the grid modules, and not the outer face of the detector, are thinner than the remaining walls of the grid modules.

3. The scattered radiation grid of claim 1, wherein the outer walls of the grid modules are embodied in such a manner that the grid modules engage in one another with a form fit.

4. The scattered radiation grid of claim 1, wherein some of the walls of the grid modules have elongations on the beam exit side, serving for alignment at the detector.

5. The scattered radiation grid of claim 1, wherein the walls of the grid or the grid modules are configured to be tapered in steps.

6. The scattered radiation grid of claim 1, wherein the walls of the grid modules forming an outer face of the grid modules are configured half as thin as the remaining walls of the grid modules.

7. The scattered radiation grid of claim 3, wherein the walls of the grid modules forming an outer face of the grid modules, and not the outer face of the detector, are half as thin as the remaining walls of the grid modules.

8. The scattered radiation grid of claim 2, wherein the outer walls of the grid modules are embodied in such a manner that the grid modules engage in one another with a form fit.

9. The scattered radiation grid of claim 2, wherein some of the walls of the grid modules have elongations on the beam exit side, serving for alignment at the detector.

10. A method of manufacturing a scattered radiation grid comprising:
printing a first layer of the radiation grid using a three-dimensional (3D) screen;
adjusting the 3D screen to provide narrower or wider openings in the 3D screen; and
printing a second layer of the radiation grid using the adjusted 3D screen.

11. The method of manufacturing a scattered radiation grid of claim 10, wherein a suspension of material with an atomic number greater than 19 and binder is used to structure the walls during the course of the 3D screen-printing.

12. The method of manufacturing a scattered radiation grid of claim 10, wherein a suspension of powdered metal and binder is used to structure the walls during the course of the 3D screen-printing.

13. The method of manufacturing a scattered radiation grid of claim 10, wherein, during the course of the 3D screen-printing, passage channels with a cross section that varies with height are produced by replacing the screen used at least once with a successively changing covered region in the screen.

14. The method of manufacturing scattered radiation grid of claim 10, wherein during the course of the 3D screen-printing, passage channels in the shape of truncated pyramids are produced by replacing the screen used a number of times with a successively narrowing covered region in the screen.

15. The scattered radiation grid of claim 10, wherein during the course of the 3D screen-printing, passage channels in the shape of truncated pyramids, the longitudinal axes of which are respectively aligned with a common focus, are shaped by replacing the screen used at least once.

16. The method of manufacturing a scattered radiation grid of claim 10, wherein, in a first production phase, passage channels and walls are aligned parallel to one another and a mechanical shaping process is applied before a final hardening, bringing about an alignment of the passage channels with a common focus.

17. The method of manufacturing a scattered radiation grid of claim 16, wherein, to shape it mechanically, the scattered radiation grid is pressed into the shape of a truncated cone from a cuboid.

18. The method of manufacturing a scattered radiation grid of claim 16, wherein, to shape it mechanically, at least one of the radiation entry side and radiation exit side is pressed onto a cylindrical or spherical surface.

19. The method of manufacturing a scattered radiation grid of claim 10, wherein passage channels are embodied as narrowed in the region of the beam exit side of the scattered radiation grid.

20. The method of manufacturing a scattered radiation grid of claim 10, wherein a longitudinal axes of passage channels are aligned with the focus.

21. The method of manufacturing a scattered radiation grid of claim 10, wherein outer walls of the grid are configured to engage a second grid with a form fit.

22. The method of manufacturing a scattered radiation grid of claim 10, wherein a plurality of walls of the grid has elongations on the beam exit side, serving for alignment at the detector.

23. The method of manufacturing a scattered radiation grid of claim 11, wherein, during the course of the 3D screen-printing, passage channels with a cross section that varies with height are produced by replacing the screen used at least once with a successively changing covered region in the screen.

24. The method of manufacturing a scattered radiation grid of claim 11, wherein during the course of the 3D screen-printing, passage channels in the shape of truncated pyramids are produced by replacing the screen used a number of times with a successively narrowing covered region in the screen.

25. The method of manufacturing a scattered radiation grid of claim 12, wherein, during the course of the 3D screen-printing, passage channels with a cross section that varies with height are produced by replacing the screen used at least once with a successively changing covered region in the screen.

26. The method of manufacturing a scattered radiation grid of claim 12, wherein during the course of the 3D screen-printing, passage channels in the shape of truncated pyramids are produced by replacing the screen used a number of times with a successively narrowing covered region in the screen.

* * * * *

UNITED STATES PATENT AND TRADEMARK OFFICE
CERTIFICATE OF CORRECTION

PATENT NO. : 9,583,228 B2
APPLICATION NO. : 14/391809
DATED : February 28, 2017
INVENTOR(S) : Mario Eichenseer et al.

Page 1 of 1

It is certified that error appears in the above-identified patent and that said Letters Patent is hereby corrected as shown below:

On the Title Page

Item (72) should be corrected to read:
Mario Eichenseer, Hirschaid (DE)
Andreas Freund, Heroldsbach (DE)
Stefan Wirth, Erlangen (DE)
Guenter Stephani, Grosserkmannsdorf (DE)
Guido Stribritz, Jena (DE)
Alexander Strauss, Dresden (DE)
Thomas Studnitzky, Dresden (DE)

Signed and Sealed this
Ninth Day of July, 2019

Andrei Iancu
*Director of the United States Patent and Trademark Office*